United States Patent [19]

Shontz et al.

[11] Patent Number: 5,022,313

[45] Date of Patent: Jun. 11, 1991

[54] COMPOSITE PISTON ASSEMBLY FOR AUTOMOTIVE AIR CONDITIONING COMPRESSOR

[75] Inventors: Kimball C. Shontz, E. Amherst; Michael A. Gavlak, Grand Island; David M. Ebbing, Clarence Center, all of N.Y.

[73] Assignee: General Motors Corporation, Detroit, Mich.

[21] Appl. No.: 461,711

[22] Filed: Jan. 8, 1990

[51] Int. Cl.$^5$ .................... F16J 9/00; B23P 19/02
[52] U.S. Cl. .................................. 92/248; 29/525; 29/888.047
[58] Field of Search ............... 264/275, 279; 29/453, 29/525, 888.047; 92/175, 248, 254

[56] References Cited

U.S. PATENT DOCUMENTS

| | | | |
|---|---|---|---|
| 1,748,612 | 2/1930 | Muhlfeld | 92/172 |
| 2,387,181 | 1/1942 | Procter | 92/254 |
| 3,150,570 | 9/1964 | Johnson et al. | 92/28 |
| 3,354,791 | 11/1967 | Wahlmark | 29/888.044 |
| 4,070,122 | 1/1978 | Wisner | 29/888.04 X |
| 4,336,920 | 6/1982 | Murray | 264/275 X |
| 4,348,348 | 9/1982 | Bennett et al. | 264/279 X |
| 4,453,300 | 6/1984 | Klimek et al. | 29/888.044 |
| 4,551,292 | 11/1985 | Fletcher et al. | 264/275 X |
| 4,690,617 | 9/1987 | Oda et al. | 92/248 X |
| 4,794,894 | 1/1989 | Gill | 29/525 X |

*Primary Examiner*—Edward K. Look
*Assistant Examiner*—John Ryznic
*Attorney, Agent, or Firm*—R. L. Phillips

[57] ABSTRACT

A composite piston for an automotive air conditioning compressor is provided having an aluminum shank or piston rod, a reinforced plastic piston head and a steel ball for engaging a socket plate or the like. The shank has a distal end that has a slight reverse taper and a knurled surface for providing attachment to the plastic head that is molded thereon. The proximal end of the shank has a barrel to which the steel ball is press fitted. The shank is provided with a first collar adjacent the knurled distal end of the shank and a second collar adjacent to and intermediate the first collar and the proximal end of the shank. The first collar provides a seal for the mold cavity into which plastic is injected to form the piston head over the knurled surface of the shank. The second collar provides a support for the press fit operation of the steel ball onto the distal end of the shank.

3 Claims, 2 Drawing Sheets

COMPOSITE PISTON ASSEMBLY FOR AUTOMOTIVE AIR CONDITIONING COMPRESSOR

TECHNICAL FIELD

The present invention relates generally to piston assemblies and, more particularly, to a composite piston assembly utilized in an automotive air conditioning compressor and a method of fabrication.

BACKGROUND OF THE INVENTION

Variable displacement compressors are being established as the preferred means for compressing refrigerant in air conditioning systems of present day motor vehicles. The compressor typically includes a plurality of cylinders, each adapted to receive a piston for reciprocal compressing action. As is commonly known, the piston includes a piston head sealed around the inner annular surface of the cylinder, and a piston rod driving the piston head to provide the desired compressive action.

A typical design places a number of radially disposed cylinders equally angularly spaced about the axis of a central drive shaft. A swash plate or wobble plate is received about and is operatively connected to the drive shaft. During operation of the compressor, rotation of the drive shaft imparts a drive movement including radially reciprocating action to the swash plate. The swash plate responds to the drive movement by nutating about the drive shaft, thus imparting a linear reciprocating motion to the individual pistons. This cooperative interaction dictates that the most effective connection between the swash plate and the associated piston rod is a ball joint.

An automotive air conditioner is a unique environment for piston operation. It is advantageous to reduce the size of automotive air conditioning systems as much as possible to reduce the overall weight of the vehicle, to lower the cost and to conserve valuable space. It is also, of course, desirable to improve its operating efficiency. It can be appreciated that substantial momentum forces are capable of being produced due to the extreme accelerations imparted to a compressor piston. Accordingly, there is an additional need to reduce the weight, and thus the mass of the piston itself in order to reduce the forces generated by the piston action. In turn, substantial energy can be saved due to a reduction in the force required to drive the multi-cylinder compressors.

Historically, pistons for swash plate compressors have been of unitary construction, machined from a durable metal body, such as a steel alloy. This prior art construction provides the desired strength, but unfortunately has an undesirably high mass. While improvements in hardening and machining techniques have allowed lighter weight metals, such as aluminum, to be substituted, the unitary construction still dictates that a relatively high mass structure be provided.

In an attempt to provide an improved swash plate compressor piston, some artisans turn their attention away from a unitary or integral construction to providing individual components that are assembled in an attempt to provide an improved structure. An example of such a design is disclosed in U.S. Pat. No. 3,354,791 to Wahlmark, issued Nov. 28, 1967. The piston there disclosed is constructed of separate piston head, shank and ball components. The shank is fabricated from a strip of spring steel rolled into a hollow tube. The fabrication process of the shank creates a seam that allows the shank to be compressed radially. This allows the shank to be inserted into a bore machined within separate head and ball components, both being made of a high strength steel alloy. The complete piston is relatively light-weight since the shank (piston rod) is hollow.

While this design provides a simple and inexpensive approach to a piston assembly of equivalent strength and durability as compared to the standard unitary design, further improvement is needed. More specifically, the generally high masses associated with metals creates a need for use of alternative materials. However, it should be appreciated that strength and durability cannot be compromised and, thus, an optimum design is desired to provide enhanced strength to the piston assembly at critical points, including the piston rod. The new approach must assure that the entire piston assembly when subjected to the substantial stresses generated during the compressing action is not subject to failure.

SUMMARY OF THE INVENTION

It is therefore a primary object of the present invention to provide a piston assembly that is relatively lightweight but maintains the desired qualities of maximum strength and durability and related method of fabrication.

It is still another object of the present invention to provide a composite piston assembly capable of operating at extreme accelerations while minimizing the mass of the assembly, and thus reducing the power input required to drive it.

Still another object of the invention is to provide a composite piston assembly constructed of separate piston head, shank (rod) and ball components to substantially reduce the stresses at junction points associated with unitary metallic pistons.

An additional object of the present invention is to provide an improved composite piston assembly constructed of separate piston head, shank and ball components to allow replacement of individual components, if necessary.

It is a further object of the present invention to provide a composite piston assembly whose separate component parts are securely attached to form a piston adapted for a long service life.

Yet another object of the present invention is to provide a composite piston assembly that is lightweight, economical, simple in design and easily assembled.

Additional objects, advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a composite piston assembly is provided that is relatively lightweight while maintaining the desired strength and durability characteristics required for operation in an automotive air conditioning compressor.

The composite piston assembly includes a shank or piston rod along the entire length to provide the appropriate strength and support to the assembly. The distal end of the shank (opposite to the point of attachment to the drive plate) includes a deeply knurled cylindrical surface designed to provide improved bonding capabilities to the piston head. The proximal end of the shank has a cylindrical barrel adapted to be press fit within a matching bore of a ball. The ball provides the optimum connection for multi-angle movement between the piston assembly and the swash plate of the air conditioning compressor. In the preferred embodiment, the shank is machined from solid aluminum stock to provide a lightweight, yet strong support to the piston assembly. The ball is fabricated of steel to provide the appropriate wear durability as it responds to the swash plate driving movement with ball joint action.

The piston head is molded of fiberglass-reinforced plastic to reduce the weight of the piston assembly while maintaining its integrity as it reciprocates within the cylinder. The piston head is provided with a plurality of equally spaced radial gussets to provide reinforcement to the plastic structure. The piston head has an annular groove to accommodate a sealing ring.

According to an important aspect of the invention, the shank includes a sealing collar adjacent the knurled distal end. This sealing collar assists in the assembly of the piston head onto the shank.

In the fabrication method of the invention, the plastic piston head is formed and simultaneously attached to the shank by injection molding. The mold cavity seals around the sealing collar to prevent the escape of the molten plastic. Advantageously, the plastic piston head forms a tight bond with the deeply knurled surface of the shank. The secure attachment between the piston head and the shank is further enhanced by the provision of a 5° reverse taper to the knurled distal end.

Advantageously, the shank is further provided with a support or installation collar intermediate the sealing collar and the proximal end of the shank. The support collar provides a pressure point to assist in forming the press fit of the steel ball onto the proximal end of the shank.

During fabrication, the sealing collar and support collar define an annular recess to receive a separate forked installation tool. This tool provides independent support to the shank as the ball is pressed into place, and thus isolates the formed piston from any outside installation force.

As will now be realized, the piston assembly is easily fabricated. The shank is first machined from aluminum bar stock. The resulting machined shank has a proximal end shaped substantially like a barrel with the desired radial dimension. The distal end is formed with the slight reverse taper and provided with a deeply knurled surface. A section of the shank between the proximal and distal ends is machined to provide the two spaced collars. The sealing collar is formed adjacent the knurled distal end and the support collar is formed opposite thereto.

A mold preferably comprised of a pair of mold sections is placed over the knurled distal end. Advantageously, the sealing collar mates with an opening in the base of the mold. The mold has a small injection gate opposite to where the opening engages the sealing collar. The fiberglass-reinforced plastic is injected into the mold to form the piston head. The mating engagement between the sealing collar of the shank and the mold prevents plastic from escaping from the mold cavity.

Once the plastic piston head has sufficiently set, the mold is opened and separated along the split lying in a plane including the axis of the shank. The mold is flexible allowing removal at an angle to the axis. The inherent flexibility of the piston head assists in this step. This arrangement allows easy formation of the head including the gussets extending radially outwardly along the body. The annular sealing groove is machined into the head or may be formed as a part of the molding process to receive a sealing ring (not shown).

The piston head-shank combination is thus ready to have the steel ball that engages the corresponding socket on the swash plate to be attached. This is accomplished by placing the installation tool in between the sealing collar and the support collar. A steel ball having a cylindrical bore of radial dimension slightly less than the barrel of the shank's proximal end is press fit onto the shank. It can be appreciated that the support or back up forces required to resist the forces generated when press fitting the steel ball into place are provided by the support collar. If desired, the installation tool may comprise a fork on the end of a C-clamp with the screw portion and pad serving to press fit the steel ball into place.

A composite piston assembly that is lightweight yet maintains its strength and durability is thus provided. The aluminum shank provides the appropriate support to the piston assembly and is positioned to accept the greatest stresses generated during piston operation. The steel ball provides the appropriate connection between the piston assembly and the swash plate to respond with ball joint action. The fiberglass reinforced plastic piston head further reduces the weight of the assembly and is provided with radial gussets to create the desired reinforcement to the piston head. The composite piston assembly operates efficiently within the compressor so as to reduce the input force required to compress the refrigerant fluid.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of this specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
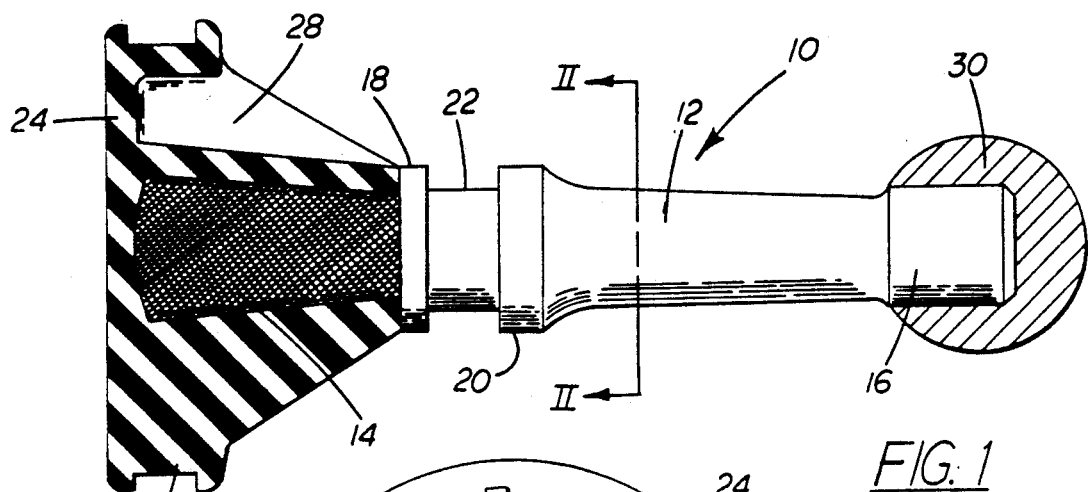
FIG. 1 is a cross-sectional view of the composite piston assembly; the piston head and steel ball being shown in cross-section while the shank (piston rod) is shown in general side elevation.

Reference is now made to the drawing and particularly to FIG. 1 showing the composite piston assembly 10 of the present invention. The piston assembly 10 includes a shank or piston rod 12 that extends substantially along the entire length and provides the desired support. In the preferred embodiment, the shank is fabricated of stock aluminum and machined to form the various diverse features. This is a key component that allows the construction of a piston assembly 10 that is relatively light in weight yet maintaining the desired strength needed to withstand the stresses generated during compressor operation.

As shown in the drawings, shank 12 has a distal end 14 and a proximal end 16. The distal end 14 is opposite to the point of attachment to the drive plate of the compressor (not shown), and has a deeply knurled cylindrical surface that provides an advantageous attachment feature. The proximal end 16 has a cylindrical barrel having a desired radial dimension. The knurled distal end 14 and the barreled proximal end 16 serve as attachment sites for other separate assembly components.

Adjacent the knurled distal end 14 is provided a sealing collar 18. A support or installation collar 20 is provided on the shank 12 intermediate the sealing collar 18 and the barreled proximal end 16. The collars 18, 20 define a recessed annular surface 22 on the shank 12. Advantageously, the collars 18, 20 and annular surface 22 cooperatively interact to further assist in the fabrication of the piston assembly by providing a position for engagement by an installation tool S.

As shown in FIG. 1, the piston assembly 10 also includes a piston head 24. Advantageously, the piston head is molded of fiberglass-reinforced plastic to lessen the weight of the piston assembly 10 as compared with prior art structures. This is important in reducing the input force required to accomplish the desired compressive action generated by the compressor. The piston head 24 is provided with an annular groove 26 adapted to receive a sealing ring (not shown). This enhances efficient operation by preventing the leakage of fluid between the annular cylinder surface of the cylinder and the piston head 24.

Figure 2:
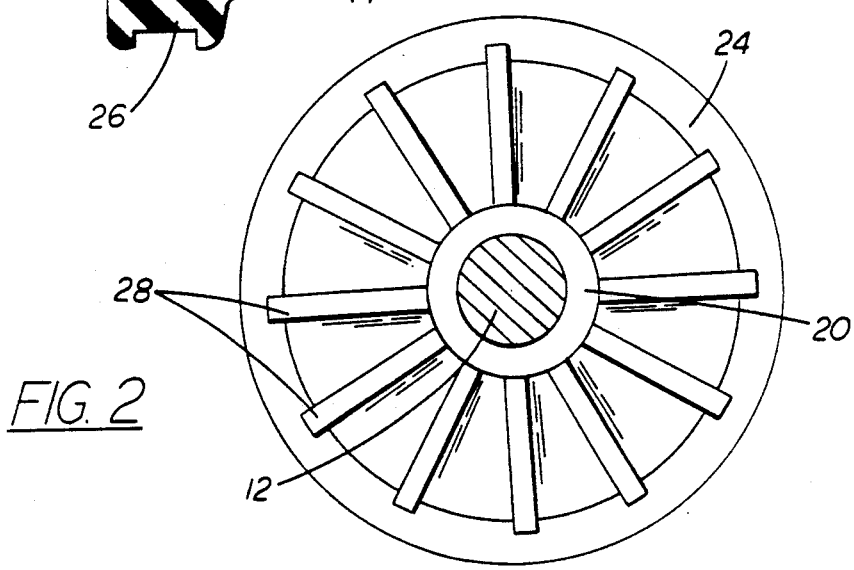
FIG. 2 is a cross-sectional view of the composite piston assembly taken along lines II—II in FIG. 1 showing in particular the radial gussets of the piston head.

As best shown in FIGS. 1 and 2, the piston head 24 is provided with a plurality of radial gussets 28 to give the desired reinforcement to the plastic piston head 24.

Referring again to FIG. 1, the piston assembly further includes a ball 30 attached to the proximal end 16 of the shank 12. The ball 30 advantageously provides the ball joint connection between the piston assembly and the swash plate of the automotive air conditioning compressor. During operation of the compressor, the swash plate nutates in response to compressor action. This nutating action imparts the linear reciprocating action to the piston. In order to efficiently convert the nutating action to the piston's reciprocating action, the ball 30 is free to move in infinite multi-angle direction following the movement of the mating seat in the wobble plate. In the preferred embodiment, the ball 30 is fabricated of steel to provide the desired wear durability.

The steel ball 30 includes a cylindrical bore 32 adapted to receive the barreled proximal end 16 of the shank 12. The cylindrical bore 32 has a radial dimension slightly smaller than the radial dimension of the barreled end 16. Thus, upon assembly, a very secure force fit is generated between the ball 30 and the shank 12.

It can be appreciated that because of the relative radial dimensions of the barreled proximal end 16 and the cylindrical bore 32, substantial force is required to press fit the steel ball 30 onto the shank 12. This force is resisted by the engagement of the forks of an installation tool S with the support collar 20 (see FIG. 4c).

According to an important aspect of the invention, the piston assembly 10 is easily constructed and assembled. The shank 12 is first machined from aluminum bar stock. The machining process results in the formation of the knurled distal end 14, the barreled proximal end 16 and the collars 18, 20 defining the recessed annular surface 22. In addition to the deep knurls provided on the distal end 14, a 5° reverse taper is provided to further assist in the attachment between the shank 12 and the piston head 24.

Figure 3:
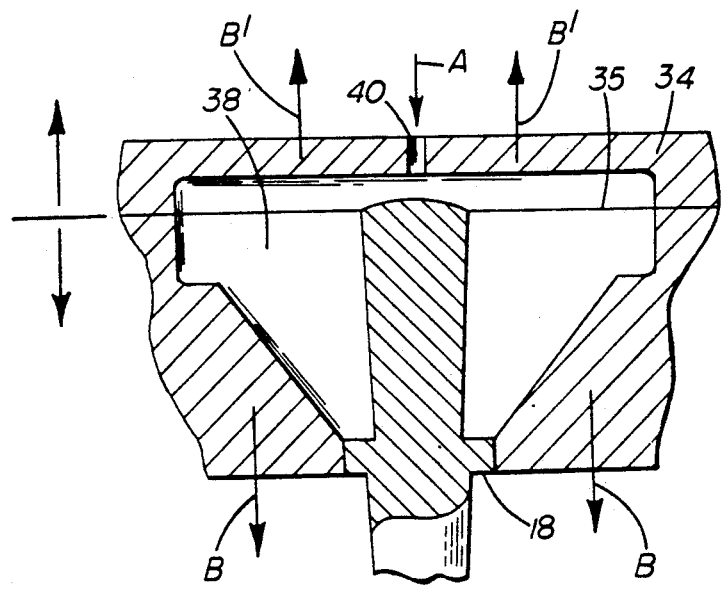
FIG. 3 is an enlarged cross-sectional view of the mold utilized to construct the piston head.
Figure 4A:
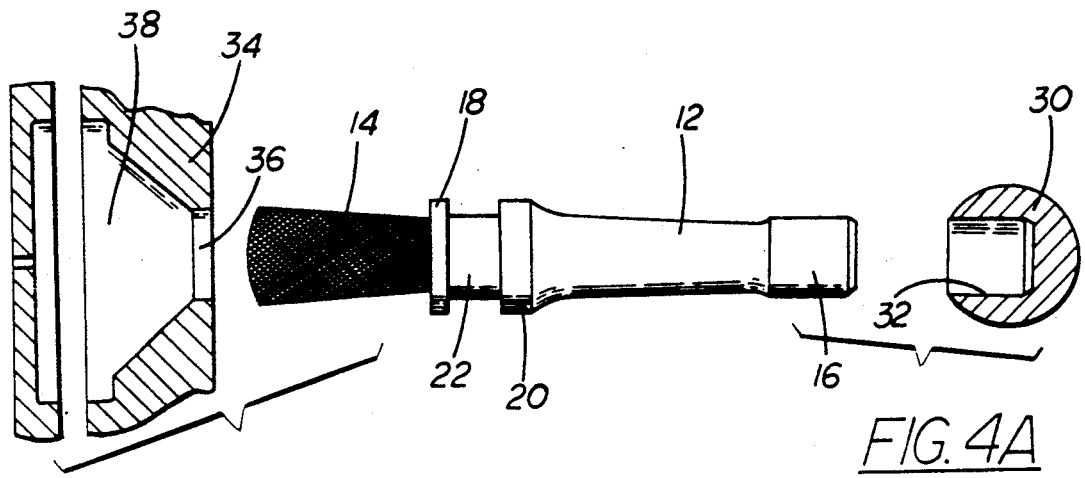
FIG. 4a is an exploded view and partial cross-section showing the piston assembly components in preparation for assembly.

The plastic piston head 24 is injection molded and simultaneously attached to the shank 12. This step is accomplished utilizing a piston head mold 34 as shown in FIG. 3 that is preferably made of a pair of mold sections. In FIG. 4a, the mold 34 is shown prior to engagement with the shank 12. An opening 36 is provided at the base of the mold 34. The opening 36 mates with the sealing collar 18 to substantially close the opening 36. Thus, a mold cavity 38 is defined substantially forming the shape of the piston head 24. The seal provided by the sealing collar 18 tightly closing the opening 36 prevents any leakage of molten plastic from the mold cavity 38 during the molding operation.

Figure 4B:
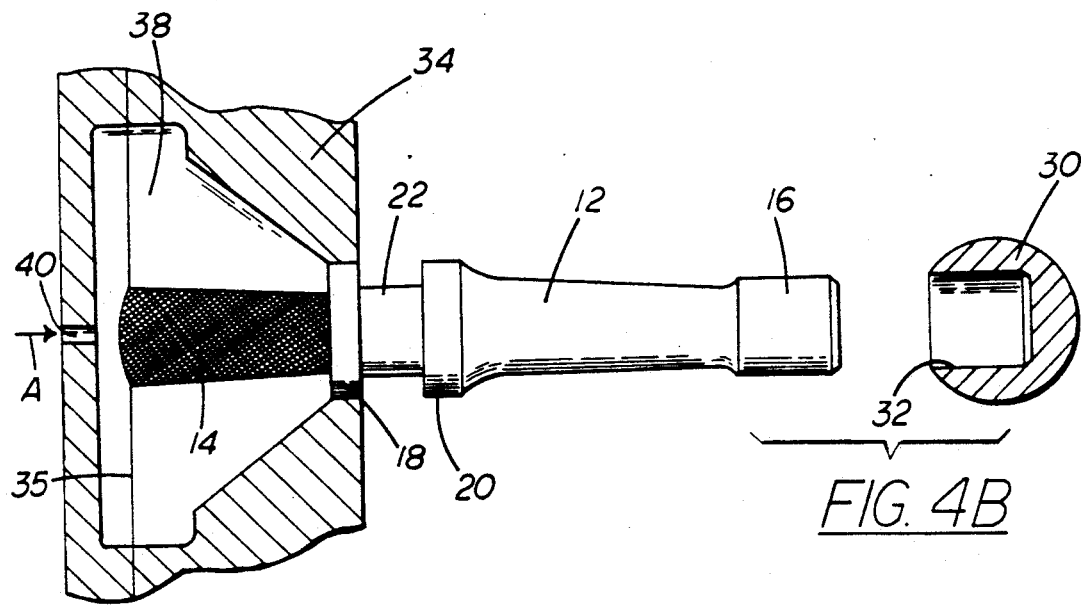
FIG. 4b is a view in partial cross-section showing the mold in position on the shank in preparation for forming the piston head.
Figure 4C:
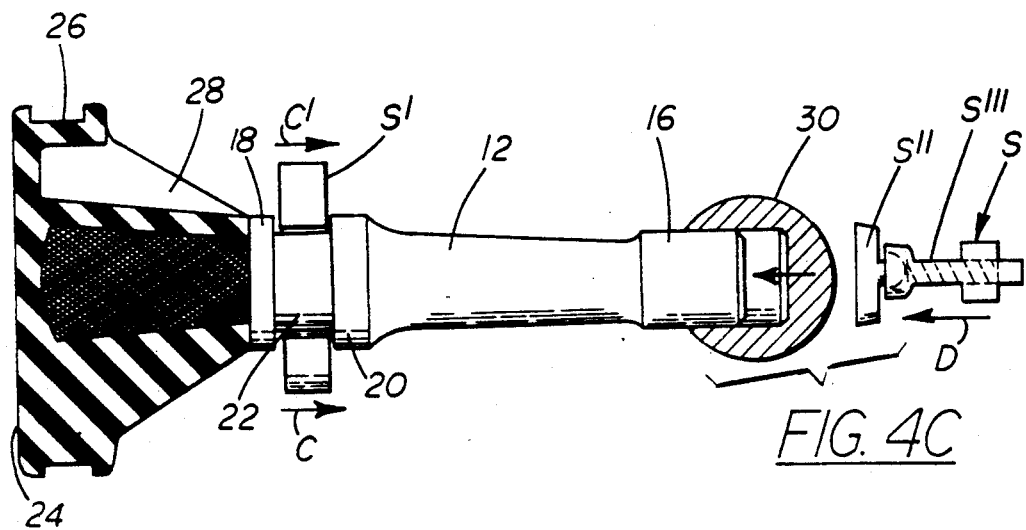
FIG. 4c is a view in partial cross-section showing the steel ball being press fit onto the shank-piston head combination.

A gate 40 is provided to allow the fiberglass-reinforced plastic to flow into the mold cavity 38. The plastic is injected through gate 40 as indicated by action arrow A in FIG. 3 and FIG. 4b. FIG. 4b shows the mold 34 being placed upon the shank 12 just prior to injection of plastic into the mold cavity 38.

The plastic injected into cavity 38 is allowed to flow and then firmly set around the knurled surface of the distal end 14 of shank 12. The deep ridges of the knurled surface positively assists in the tight bond created between the aluminum shank 12 and the plastic piston head 24. In addition, the slight reverse taper given to the distal end 14 provides further resistance to the disengagement of the piston head 24 from the shank 12.

Once the plastic piston head 24 has firmly set around the knurled distal end 14 of the shank 12, the mold 34 is removed along the separation line (see line 35 on the piston head 24; FIG. 3). The piston head 24 and the mold 34 are sufficiently flexible to allow the mold to be separated in opposing directions from the axis of the shank 12. The mold sections are then moved outwardly and axially along the shank 12 towards the barreled distal end 16 to clear the formed gussets 28 and the top of the piston (see action arrows B in moves from the top of the piston (see action arrows B, B' in FIG. 3). This assists in efficient formation of the head 24 by providing easy mold disassembly while substantially reducing the possibility of damage to the head 24 during mold 34 removal. Following removal of the mold 34, the annular groove 26 is machined into the piston head 24 and the sealing ring installed. Alternatively, the groove 26 may be formed as a part of the molding process itself.

The final step of the piston assembly process involves the attachment of the steel ball 30. As described above, the cylindrical bore 32 of the steel ball 30 is provided with a radial dimension slightly smaller than the radial dimension of the barreled proximal end 16 of the shank 12. To make the attachment, the steel ball 30 must be press fit onto the barreled proximal end 16. It can be appreciated that substantial force must be applied to the steel ball 30 to accomplish this step. It can be further appreciated that the plastic piston head 24 previously formed on the shank 12 is not strong enough to provide a pressure point to counter the force required. Thus, the separate installation tool S (shown in FIG. 4c) may be placed adjacent the recessed annular surface 22 and the support collar 18. The installation tool S may include a fork S' on the end of a C-clamp with the screw portion S' and pad S''' serving to press fit the steel ball into place. The collar 18 resists the force (indicated by action arrows C, C') in response to the pressing force (indicated by action arrow D) exerted during the press fit of steel ball 30 thus advantageously allows the integrity of the piston head 24 to be maintained during the assembly operation by isolating it from any outside installation force.

In summary, numerous benefits are obtained by use of the present invention. The piston assembly includes a lightweight shank 12, a fiberglass-reinforced plastic piston head 24 and a steel ball 30 securely assembled to provide a piston assembly of relatively lightweight construction, yet maintaining the strength and durability required for use within an automotive air conditioning compressor. The shank 12 is provided with a knurled distal end 14 having a slight reverse taper that positively bonds to the plastic piston head 24 that is molded thereon. A sealing collar 18 is provided on the shank 12 to assist in sealing the mold cavity 38 during the piston head forming process. The plastic piston head 24 has radial gussets 28 to provide the needed reinforcement to the plastic structure. A support collar 18 is provided on the shank 12 to provide a supporting surface for an installation tool S to assist during the press fit of steel ball 30 onto barreled distal end 16 of shank 12. There is thus provided a composite piston assembly that is economical, simple in design and easy to assemble.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

What is claimed is:

1. A composite piston for an automotive air conditioning compressor, comprising:
    a metallic shank having a distal end and a proximal end;
    a plastic piston head attached to said distal end of said metallic shank, said piston head having a plurality of radial gussets to provide reinforcement;
    a metallic ball attached to said proximal end of said metallic shank;
    a first collar on said metallic shank attached to said resilient head, said first collar assisting in the assembly of said resilient head on said metallic shank; and
    a second collar intermediate said first collar and said metallic ball, said second collar assisting in the assembly of said metallic ball on said metallic shank,
    whereby is provided a lightweight piston for efficient operation.

2. A composite piston for an automotive air conditioning compressor, comprising:
    a metallic shank having a distal end and a proximal end, said distal end having a relatively slight reverse taper and further having a knurled surface, said proximal end having a barrel;
    a piston head formed of plastic molded to said distal end of said metallic shank, said reverse taper and said knurled surface assuring secure attachment, said piston head having a plurality of radial gussets to provide reinforcement;
    a steel ball attached by press fit to said barrel of said proximal end;
    a first collar adjacent said piston head, said first collar providing a seal for the molding of said head; and
    a second collar intermediate said first collar and said steel ball, said second collar providing support for the press fit assembly of said steel ball on said metallic shank,
    whereby is provided a lightweight piston for efficient operation.

3. A method of forming and assembling a composite piston, comprising:
    machining a metallic shank including a proximal end and a distal end and a first and second collars adjacent said distal end;
    inserting said distal end into a mold cavity, said first collar providing a seal to said mold cavity;
    injecting plastic into said mold cavity to form a piston head on said distal end of said shank;
    separating said mold cavity from said shank;
    attaching a steel ball to said proximal end of said shank by press fit, said second collar providing support for said press fit assembly.

* * * * *